(12) United States Patent
Kolozsvari et al.

(10) Patent No.: US 8,904,966 B2
(45) Date of Patent: Dec. 9, 2014

(54) ARTICULATING CONSUMABLE CHEW TOY

(75) Inventors: Kevin L. Kolozsvari, Cowan Heights, CA (US); Greg Leong, Irvine, CA (US); Jim McCafferty, San Clemente, CA (US); Robert Guthrie, Santa Ana, CA (US)

(73) Assignee: Precision Pet Products, Costa Mesa, CA (US)

( * ) Notice: Subject to any disclaimer, the term of this patent is extended or adjusted under 35 U.S.C. 154(b) by 384 days.

(21) Appl. No.: 12/966,589

(22) Filed: Dec. 13, 2010

(65) Prior Publication Data
US 2012/0145090 A1 Jun. 14, 2012

(51) Int. Cl.
*A01K 29/00* (2006.01)
*A01K 11/00* (2006.01)

(52) U.S. Cl.
CPC .................................. *A01K 15/026* (2013.01)
USPC ....................................................... 119/710

(58) Field of Classification Search
USPC .......................................... 119/707, 709, 710
See application file for complete search history.

(56) References Cited

U.S. PATENT DOCUMENTS

| | | | |
|---|---|---|---|
| 2,610,851 A | 9/1952 | Jones | |
| 2,662,335 A * | 12/1953 | Calverley | 446/99 |
| 3,107,651 A | 10/1963 | Beck | |
| 4,309,038 A * | 1/1982 | Spoon | 473/596 |
| D346,048 S | 4/1994 | Jandebeur et al. | |
| 5,419,283 A | 5/1995 | Leo | |
| 5,827,565 A | 10/1998 | Axelrod | |
| 5,897,417 A * | 4/1999 | Grey | 446/125 |
| 5,897,893 A | 4/1999 | Mohilef | |
| 6,126,978 A | 10/2000 | Axelrod | |
| 6,159,516 A | 12/2000 | Axelrod | |
| 6,180,161 B1 | 1/2001 | Axelrod | |
| 6,216,640 B1 * | 4/2001 | Zelinger | 119/707 |
| 6,455,083 B1 | 9/2002 | Wang | |
| 6,725,809 B1 | 4/2004 | Olgin | |
| 6,990,927 B2 * | 1/2006 | Axelrod | 119/707 |
| D530,484 S | 10/2006 | Ahmed et al. | |
| D532,183 S | 11/2006 | Munday et al. | |
| D535,806 S | 1/2007 | Unlu | |
| D536,506 S | 2/2007 | Unlu | |
| D537,231 S | 2/2007 | Unlu | |
| D551,426 S | 9/2007 | Ahmed et al. | |
| D587,427 S | 3/2009 | Torney et al. | |
| D587,428 S | 3/2009 | Torney et al. | |
| D587,429 S | 3/2009 | Torney et al. | |
| 7,579,038 B1 | 8/2009 | Weinberg | |
| D603,127 S | 11/2009 | Townsend et al. | |

(Continued)

FOREIGN PATENT DOCUMENTS

WO WO 2006/121873 11/2006

*Primary Examiner* — Tien Dinh
*Assistant Examiner* — Justin Benedik
(74) *Attorney, Agent, or Firm* — Stetina Brunda Garred & Brucker

(57) ABSTRACT

Provided is an edible chew toy including a first toy member and a second toy member configured to be moveably engaged with each other. The first and second toy members may be configured to pivot and/or translate relative to each other to captivate a pet. In this regard, the toy members may move relative to each other as the pet gnaws on the toy, swipes at the toy with his paws, or lifts the toy in a manner to cause gravitational movement. The chew toy may be formed from 100% consumable material to allow the pet to easily digest the chew toy as it is chewed.

18 Claims, 4 Drawing Sheets

(56) References Cited

U.S. PATENT DOCUMENTS

| | | |
|---|---|---|
| D603,128 S | 11/2009 | Townsend et al. |
| D603,132 S | 11/2009 | Townsend et al. |
| D603,578 S | 11/2009 | Townsend et al. |
| D603,579 S | 11/2009 | Townsend et al. |
| D606,279 S | 12/2009 | Townsend et al. |
| 7,677,203 B2 | 3/2010 | Stern |
| 7,691,426 B2 | 4/2010 | Axelrod |
| D624,712 S * | 9/2010 | McCann ............ D30/160 |
| 2004/0134446 A1* | 7/2004 | Keller ............ 119/707 |
| 2004/0200434 A1* | 10/2004 | Shatoff et al. ............ 119/707 |
| 2005/0045115 A1 | 3/2005 | Mann |
| 2006/0000424 A1* | 1/2006 | Axelrod ............ 119/709 |

* cited by examiner

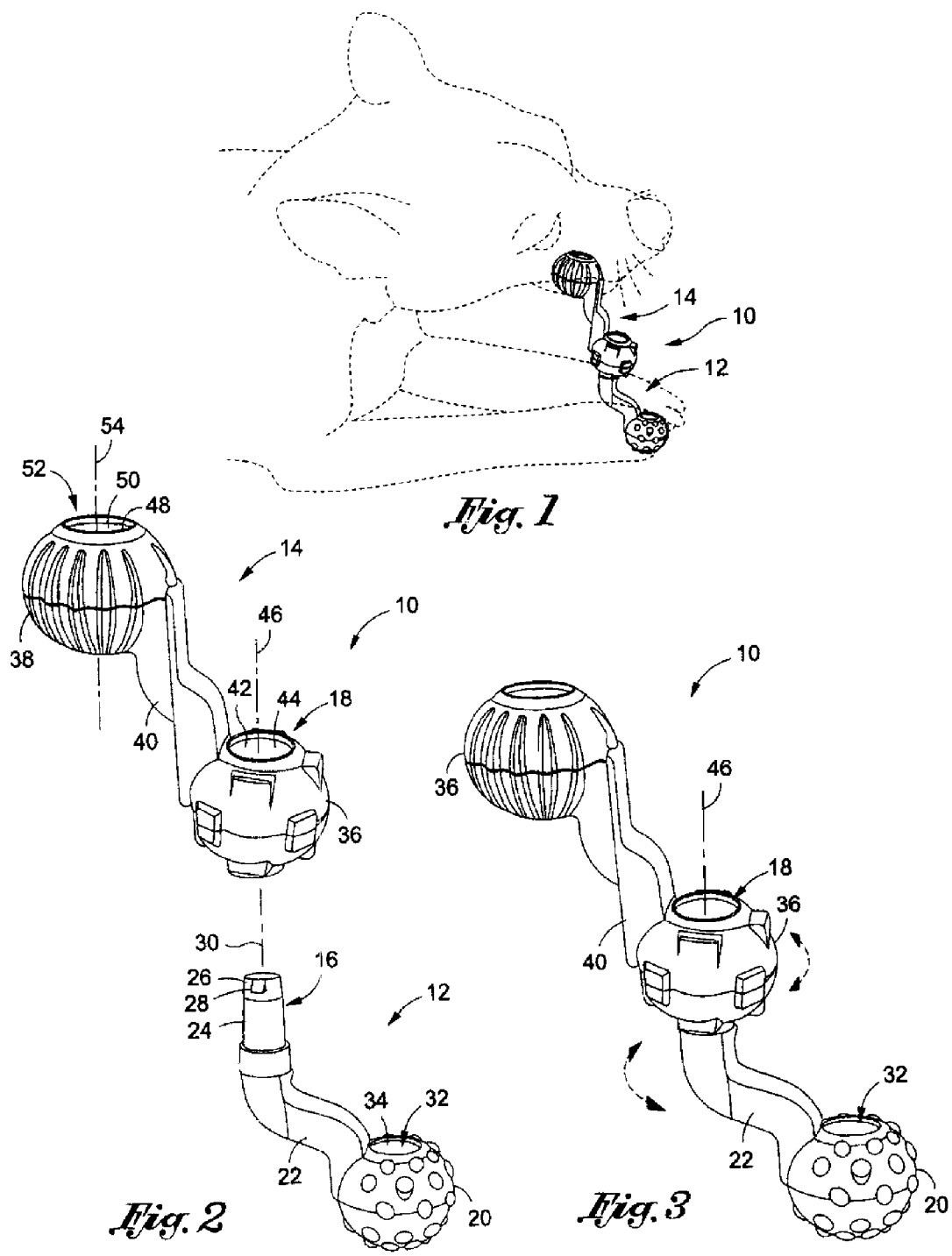

ARTICULATING CONSUMABLE CHEW TOY

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention is generally directed toward a chew toy for a pet, and more specifically to a consumable chew toy having a first member that is moveable relative to a second member.

It is well known that dogs generally enjoy chewing on objects. Accordingly, many dog owners give their dogs chew toys to entertain the dog. The chew toys may be formed from hard materials, such as cow bones, wood, nylon, or softer materials, such as polyurethane, rubber or freeze dried snacks.

Although dogs may enjoy chewing on almost any object, many chew toys or other objects given to dogs are made from an indigestible material. Therefore, as the dogs chew and gnaw on the objects, they may have adverse effects on the dog by damaging their intestinal tract, and may create life-threatening conditions. For instance, a dog may swallow a fragment of an indigestible chew toy, which may create a blockage in the dog's stomach passages.

In view of the aforementioned drawbacks of non-consumable chew toys, certain chew toys have been developed and formed from consumable materials. Consumable chew toys are relatively simple, such as a consumable material formed in the shape of a dog bone. In other words, the consumable chew toy may be formed from a single, non-moving component. Thus, although such chew toys may provide a safe alternative to non-consumable chew toys, consumable chew toys may not captivate a dog for long periods of time.

Along these lines, dogs tend to be captivated by moving objects, such as a bouncing ball. Moreover, many breeds are dogs are well known for the hunting or retrieving skills wherein the dog is capable of chasing down a moving target and retrieving it for its owner. Such hunting and retrieving skills are developed early in a dog's life. In this regard, many dog owners play "catch" with their dogs, wherein the owner tosses a ball to the dog and the dog chases down the ball, retrieves it, and brings it back to the owner. Although playing "catch" is good for the development of the dog, the owner is required to participate in the activity with the dog. Therefore, if the owner works for most of the day, the dog may be missing out on such development. Furthermore, given the relative simplicity of conventional consumable chew toys, i.e., their non-movable nature, such chew toys do not develop a dog's hunting or retrieving skills.

In view of the foregoing, there is a need in the art for a chew toy formed from a consumable material, wherein the chew toy includes moving parts to captivate a dog's attention and to aid in the development of the dog.

BRIEF SUMMARY

Provided is an edible chew toy including a first toy member and a second toy member configured to be moveably engaged with each other. In this regard, the moving parts on the edible chew toy more effectively entertain and captivate a dog, while at the same time aid in the dog's development.

The first and second toy members may be configured to pivot and/or translate relative to each other to captivate a pet. In this regard, the toy members may move relative to each other as the pet gnaws on the toy, swipes at the toy with his paws, or lifts the toy in a manner to cause gravitational movement. The chew toy may be formed from 100% consumable material to allow the pet to easily digest the chew toy as it is chewed.

The first toy member may define a first pivot axis about which the first toy member may pivot. Likewise, the second toy member may define a second pivot axis about which the second toy member may pivot. The first toy member may include a first mass member offset from the first pivot axis to urge the first toy member to pivot about the first pivot axis, and the second toy member may include a second mass member offset from the second pivot axis to urge the second toy member to pivot about the second pivot axis.

The first and second toy members may be formed via injection molding and allowed to air dry before being engaged with each other. Once engaged, the first and second toy members may be completely dried.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is an upper perspective view of an edible chew toy being held and gnawed by a dog;

FIG. 2 is an upper perspective view of the chew toy in a detached configuration;

FIG. 3 is an upper perspective view of the chew toy in a first assembled configuration;

DETAILED DESCRIPTION

Figure 5:
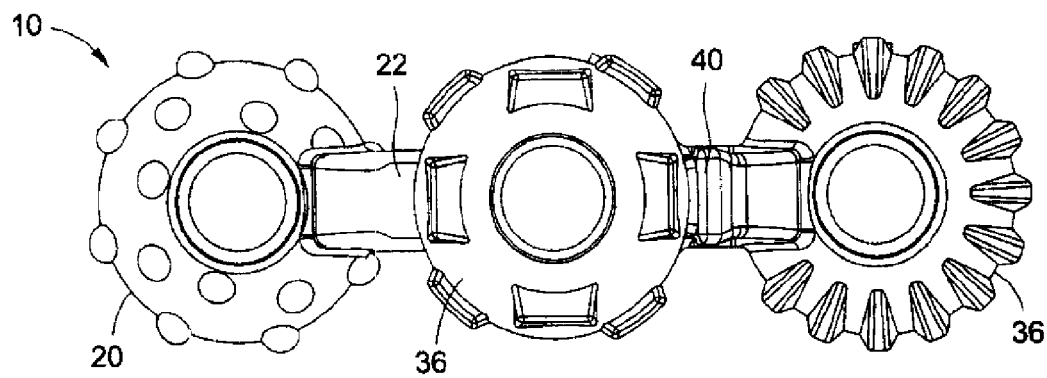
FIG. 5 is a top view of the chew toy.

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Referring now to the drawings, there is depicted a chew toy 10 including a first toy member 12 and second toy member 14 configured to be pivotable relative to each other. The first toy member 12 and/or the second toy member 14 is constructed from a 100% consumable material to allow a dog to chew and gnaw on the toy 10 without damaging the dog's digestive system. It is contemplated that a dog may be captivated by the chew toy 10 due to the consumable configuration thereof, in addition to the relative movement between the first toy member 12 and the second toy member 14. Such movement between the first toy member 12 and the second toy member 14 may be achieved by a dog swiping his paw at the toy 10, wrestling with the toy 10 while the toy 10 is in the dog's mouth, or gravity causing the movement in response to the dog lifting the toy 10.

Referring now specifically to FIGS. 2 and 3, the first toy member 12 is configured to be detachably engageable with the second toy member 14. FIG. 2 shows the first and second toy members 12, 14 in a detached configuration, while FIG. 3 shows the first and second toy members 12, 14 in a first assembled configuration. It is contemplated that the first and second toy members 12, 14 may be configured to enable engagement therebetween in a variety of assembled configurations (see FIGS. 6 and 7 which show the first and second toy members 12, 14 in a second assembled configuration).

When the first and second toy members 12, 14 are engaged with each other, they may articulate or pivot relative to each other. Along these lines, the first toy member 12 includes a first engagement portion 16 while the second toy member 14 includes a second engagement portion 18 configured to engage with the first engagement portion 16. In the particular embodiment depicted in FIG. 2, the first engagement portion 16 is a male connector and the second engagement portion 18 is a female connector sized and configured to receive the first engagement portion 16 to pivotally couple the first and second toy members 12, 14.

Referring now specifically to FIG. 2, the first toy member 12 includes a first mass member 20 and a first arm 22 extending between the first mass member 20 and the first engagement portion 16. The first engagement portion 16 includes a shaft 24 defining a tapered distal tip 26 and a pair of locking tabs 28 formed on the distal tip 26. The locking tabs 28 are configured to engage with the second toy member 14 to secure the first toy member 12 to the second toy member 14. In this regard, the pair of locking tabs 28 may be separated by a slot to facilitate movement between the pair of locking tabs 28. For instance, the locking tabs 28 may be pressed together for insertion into the second toy member 14 or for removal therefrom. As the locking tabs 28 are pressed together, the first engagement portion 16 moves from an engaged configuration toward a disengaged configuration to facilitate insertion or removal of the first toy member 12 from the second toy member 14. The engagement portion 16 may be biased toward the engaged configuration to lock in place once inserted into the second toy member 14.

The first toy member 12 may be specifically configured to facilitate pivotal movement relative to the second toy member 14 when engaged therewith. Along these lines, the first engagement portion 16 defines a first pivot access 30 about which the first toy member 12 may pivot. The first mass member 20 defines a first center of mass spaced from the first pivot access 30 to facilitate pivotally movement of the first toy member 12 about the first pivot access 30. Therefore, as the toy 10 is lifted, gravity may urge the first mass member 20 to pivot about the first pivot axis 30.

The first toy member 12 may additionally be configured to connect with additional toy members or links (not shown). In this regard, the first toy member may include a first mass engagement wall 34 extending through the first mass member 20 to define a first engagement aperture 32. The first engagement aperture 32 defines a female connector which may be engageable with a male connector defined by a separate toy member.

Referring now to the second toy member 14, there is included a second mass member 36 disposed about the second engagement portion 18, a third mass member 38 spaced from the second mass member 36, and a second arm 40 extending between the second mass member 36 and the third mass member 38. The second engagement portion 18 includes a second engagement wall 42 defining a second engagement aperture 44 extending through the second mass member 36. The second engagement aperture 44 is disposed about a second pivot axis 46, about which the second toy member 14 may pivot.

The third mass member 38 is configured similar to the second mass member 36 in that it includes a third engagement wall 48 defining a third engagement aperture 50 extending through the third mass member 38 to define a third engagement portion 52. The third engagement aperture 50 is disposed about a third pivot axis 54 about which the second toy member 14 may pivot. The second mass member 36 defines a center of mass which is spaced from the third pivot axis 54 to facilitate pivotal movement of the second toy member 14 about the third pivot axis 54. Likewise, the third mass member 38 defines a third center of mass which is spaced from the second pivot axis 46 to facilitate pivotal movement of the second toy member 14 about the second pivot axis 46.

Figure 4:
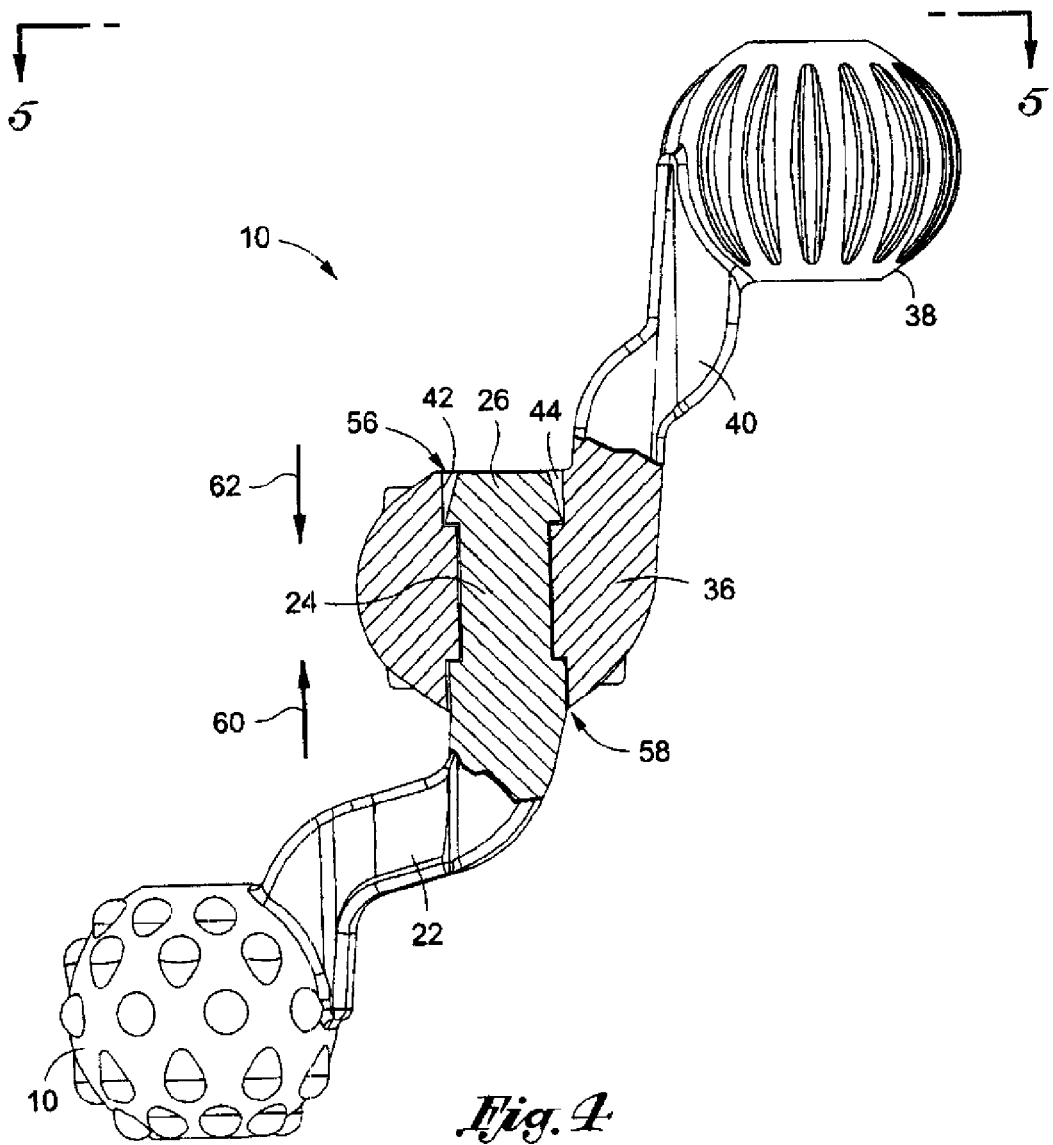
FIG. 4 is a side, partial sectional view of the chew toy in the first assembled configuration.
Figure 6:
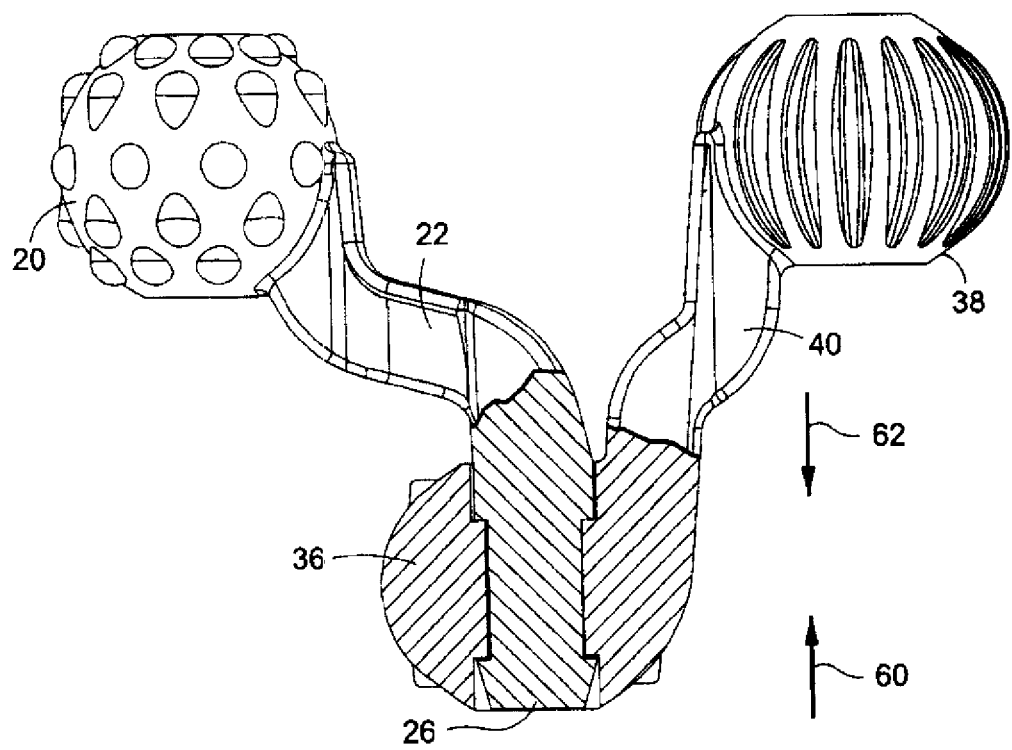
FIG. 6 is a side, partial sectional view of the chew toy in the second assembled configuration.
Figure 7:
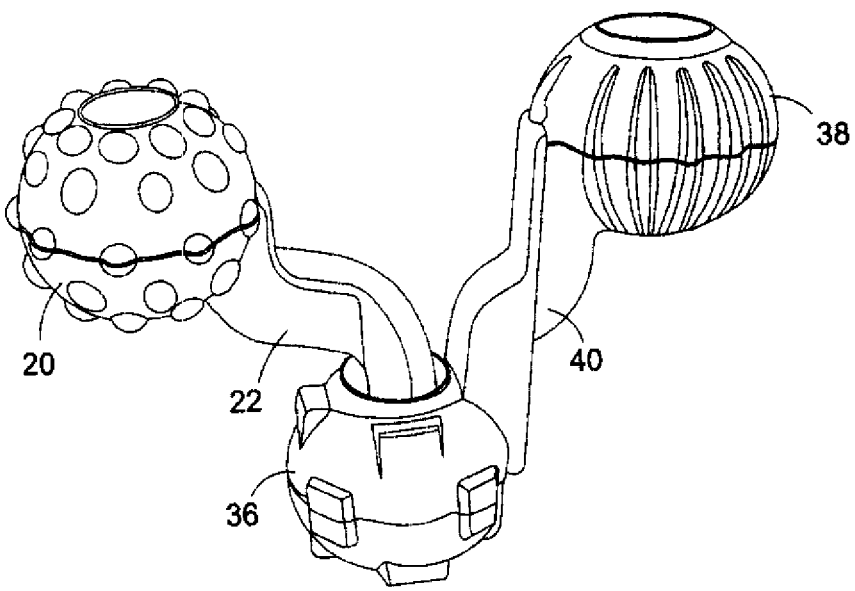
FIG. 7 is an upper perspective view of the chew toy in the second assembled configuration.

Referring now to FIG. 4, there is shown a cross-sectional view to more accurately depict the engagement between the first toy member 12 and the second toy member 14. The second engagement aperture 44 defines a first end portion 56 and an opposing second end portion 58. The second engagement wall 42 is stepped to define a larger opening adjacent the first end portion 56 and the second end portion 58, and a narrow opening between the first end portion 56 and the second end portion 58. In this regard, the first end portion 56 is substantially similar to the second end portion 58 with regard to size and shape. This allows the first toy member 12 to be inserted into the second engagement aperture 44 in a first direction 60, or an opposing second direction 62. In the configuration shown in FIG. 4, the tapered distal tip 26 of the first engagement portion 16 is inserted into the second end portion 58 of the second engagement aperture 44 in the first direction 60, and is advanced toward the first end portion 56 until the locking tabs 28 pass through the narrow portion of the second engagement aperture 44. Conversely, the first engagement portion 16 may be inserted in the second direction 62 by inserting the distal tip 26 into the first end portion 56 of the second engagement aperture 44 and advancing the distal tip 26 toward the second end portion 58 until the locking tabs 28 pass through the narrow portion of the second engagement aperture 44. This configuration is best depicted in FIGS. 6 and 7.

Once the first engagement portion 16 is inserted into the second engagement portion 18, the first toy member 12 and second toy member 14 may rotate relative to each other. In the embodiments depicted in the Figures, the first pivot axis 30 is coaxially aligned with the second pivot axis 46 upon engagement between the first engagement portion 16 and the second engagement portion 18. The shaft 24 may define an outer diameter which is slightly smaller than the diameter of the second engagement aperture 44 to allow the first and second toy members 12, 14 to freely rotate relative to each other. In this regard, the first and second engagement portions 16, 18 may be configured to mitigate friction between the first engagement portion 16 and the second engagement portion 18.

Although FIGS. 1-7 depict engagement between the first toy member 12 and the second toy member 14 via the first engagement portion 16 and the second engagement portion 18, the second toy member 14 is configured such that the first engagement portion 16 may also engage with the third engagement portion 52. In this regard, the second toy member 14 includes two female connectors, which the male connector on the first toy member 12 may be selectively engaged with. Furthermore, if the first toy member 12 is engaged with the second toy member 14 via the second engagement portion 18, a third toy member (not shown) may be engaged with the second toy member 14 via the third engagement portion 52. In this regard, the length of the chew toy 10 may be increased by adding additional toy members thereto.

According to one implementation of the chew toy 10, the first toy member 12 and second toy member 14 are formed from a 100% consumable material. In other words, the chew toy 10 may be digested by the dog/pet without harming the digestive system of the dog. Exemplary consumable materials include potato starch, corn starch, chicken digest, and combinations thereof including oil. The toy members 12, 14 may be formed via injection molding and subsequently air dried to rigidify the toy members 12, 14 and to remove moisture for assembly. The first and second toy members 12, 14 may then be assembled and allowed to completely dry. The colors of the toy members 12, 14 may be adapted by including additives known in the art, such as parsley to achieve desired appearances.

The consumable nature of the chew toy 10 allows the dog to freely chew and gnaw on the chew toy 10 without worry of harming the dog. Furthermore, the articulating nature of the chew toy 10 keeps the dog's attention and tests the dog's mind by the relative movement between the first toy member 12 and the second toy member 14.

The first, second, and third mass members 20, 36, 38 may define different textures to promote gnawing and scraping of the dog's teeth. For instance, the first mass member 20 includes a plurality of round nubs formed on the outer surface thereof. The second mass member 36 defines a plurality of square or rectangular projections thereon, and the third mass member 38 defines a series of longitudinal grooves and protrusions. Other patterns and designs may be defined by the surfaces of the first, second, and third mass members 20, 36, 38 without departing from the spirit and scope of the present invention.

The chew toy 10 may additionally be configured to produce noise as the first toy member 12 pivots or moves relative to the second toy member 14. For instance, the shaft 24 may include ridges (not shown) and the second engagement wall 42 may include grooves (not shown) that create noise when the shaft 24 rotates relative to the second engagement wall 42. Other noise making configurations known by those skilled in the art may also be employed without departing from the spirit and scope of the present invention.

Figure 8:
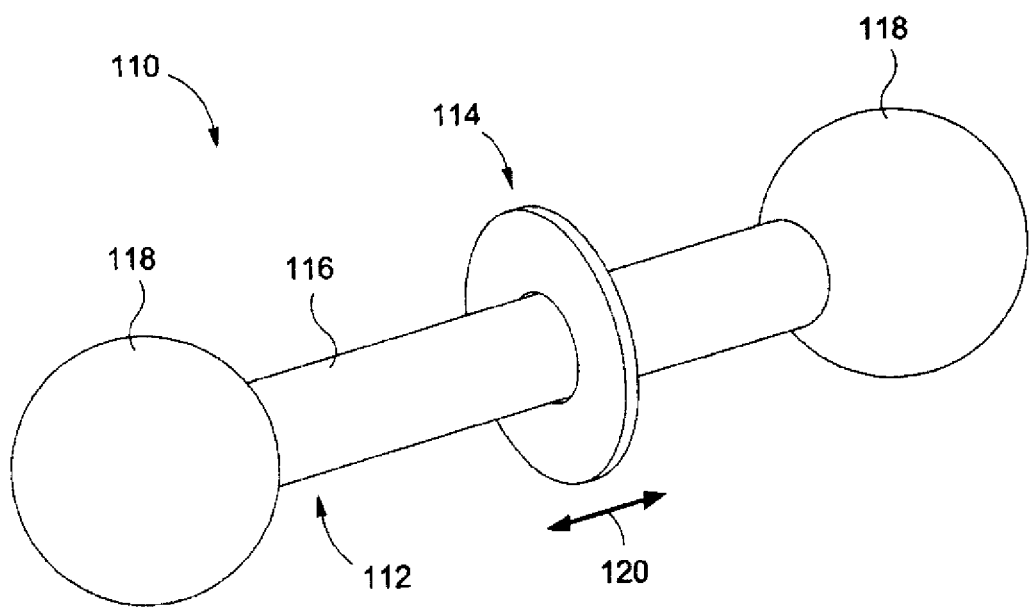
FIG. 8 is an upper perspective view of a second embodiment of a chew toy including a first toy member and a second toy member translatably coupled to the first toy member.

In addition to the foregoing, which describes a first embodiment of a chew toy 10 configured to provide pivotal movement, it is expressly contemplated that a second embodiment of a chew toy 110 (see FIG. 8) may be configured to achieve translational movement of a first toy member 112 relative to a second toy member 114. In this regard, the first toy member 112 includes an elongate rod 116 having a pair of end caps 118 disposed at opposing end portions thereof. The second toy member 114 may be translatably engaged with the first toy member 112 to achieve translational movement in a direction 120 between the pair of opposing end caps 118. Therefore, the dog's attention may be captivated by the translational movement of the second toy member 114 along the first toy member 112.

Although the foregoing describes a chew toy comprised of a first toy member 12 and a second toy member 14 both comprised of 100% consumable material, it is contemplated that only one of the first toy member 12 and the second toy member 14 may be formed out of a 100% consumable material. In this manner, the toy members 12, 14 not formed from consumable material may be a carrier configured to engage with a consumable portion. Therefore, as the dog eats or consumes the consumable portion, it may be replaced with another consumable portion, while maintaining the more permanent portion.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An edible dog chew toy comprising:
    a first toy member having a first engagement portion defining a stepped configuration, the first engagement portion including an undivided shaft having a tapered end portion; and
    a second toy member having an aperture that is of variable diameters to define a stepped configuration, the aperture being complimentary to the configuration of the first engagement portion, the first engagement portion being selectively insertable within the aperture to effectuate detachable engagement between the first toy member and the second toy member, the second toy member being moveable relative to the first toy member when engaged with the first toy member, wherein at least one of the first toy member and the second toy member are formed from a consumable material;
    the first toy member and second toy member being configured to be selectively engageable in a first configuration and a separate second configuration, in the first configuration, the first toy member extends from the second toy member in a first direction such that the first and second toy members collectively define a generally V-shaped configuration, in the second configuration, the first toy member extends from the second toy member in a second direction opposite to the first direction such that the first and second toy members collectively define a generally S-shaped configuration.

2. The edible dog chew toy of claim 1, wherein the second toy member is configured to pivot relative to the first toy member.

3. A dog chew toy comprising:
    a first toy member including a first engagement portion including an undivided shaft portion and a locking tab coupled to the shaft portion, the first toy member being formed from a first molded material; and
    a second toy member including a second engagement portion including an aperture having a stepped configuration including a first region that is of a first diameter and a second region that is of a second diameter larger than the first diameter, the second toy member being formed from a second molded material,
    the second engagement portion being sized and configured to removably engage with the first engagement portion along a first engagement axis, the shaft portion residing within the first region of the aperture and the locking tab residing within second region when the second engagement portion is engaged with the first engagement portion, the second toy member being moveable relative to the first toy member when engaged with the first toy member;

the first toy member and second toy member being configured to be selectively engageable in a first configuration and a separate second configuration, in the first configuration, the first toy member extends from the second toy member in a first direction such that the first and second toy members collectively define a generally V-shaped configuration, in the second configuration, the first toy member extends from the second toy member in a second direction opposite to the first direction such that the first and second toy members collectively define a generally S-shaped configuration.

4. The dog chew toy of claim 3, wherein the first toy member is configured to engage with the second toy member in a first direction along the first engagement axis.

5. The dog chew toy of claim 4, wherein the first toy member is configured to engage with the second toy member in an opposing second direction along the first engagement axis.

6. An edible dog chew toy comprising:
a first toy member having:
a first engagement portion including an undivided shaft portion and a locking tab coupled to the shaft portion, the first engagement portion defining a first pivot axis, the first toy member being pivotable about the first pivot axis; and
a first mass member; and
a second toy member having:
a second engagement portion including an aperture defining a second pivot axis and having a stepped configuration including a first region that is of a first diameter and a second region that is of a second diameter larger than the first portion, the second toy member being pivotable about the second pivot axis; and
a third mass member,
the second engagement portion being detachably engageable with the first engagement portion to enable pivotable movement of the second toy member relative to the first toy member, the shaft portion residing within the first region of the aperture and the locking tab residing within second region when the second engagement portion is engaged with the first engagement portion;
the first toy member and second toy member being configured to be selectively engageable in a first configuration and a separate second configuration, in the first configuration, the first toy member extends from the second toy member in a first direction such that the first and second toy members collectively define a generally V-shaped configuration, in the second configuration, the first toy member extends from the second toy member in a second direction opposite to the first direction such that the first and second toy members collectively define a generally S-shaped configuration;

wherein the first toy member and second toy member are formed from a consumable material.

7. The edible dog chew toy recited in claim 6, wherein the first mass member defines a first center of mass spaced from the first rotation axis.

8. The edible dog chew toy recited in claim 7, wherein the third mass member defines a third center of mass spaced from the second rotation axis.

9. The edible dog chew toy recited in claim 6 wherein the first rotation axis is coaxially aligned with the second rotation axis when the second engagement portion is engaged with the first engagement portion.

10. The edible dog chew toy recited in claim 6, the first engagement portion being configured to be insertable into the second engagement aperture to engage the first engagement portion to the second engagement portion.

11. The edible dog chew toy recited in claim 10, wherein the second engagement aperture defines a first end portion and an opposing second end portion, the first engagement portion being configured to be insertable into the second engagement aperture from the first end portion toward the second end portion, the first engagement portion further being configured to be insertable into the second engagement aperture from the second end portion toward the first end portion.

12. The edible dog chew toy recited in claim 6 configured for use with a supplemental toy member, wherein the first toy member includes a first engagement wall defining a first engagement aperture being sized to receive the supplemental toy member.

13. The edible dog chew toy recited in claim 12, wherein the first mass member is disposed about the first engagement wall.

14. The edible dog chew toy recited in claim 6, wherein the second toy member includes a second mass member and a third engagement portion, the third engagement portion defining a third pivot axis, the second toy member being pivotable about the third rotation axis.

15. The edible dog chew toy recited in claim 14, wherein the second mass member defines a second center of mass spaced from the third pivot axis.

16. The edible dog chew toy recited in claim 14, wherein the second mass member is disposed about the second engagement portion.

17. The edible dog chew toy recited in claim 6, wherein the second toy member includes a third engagement portion, the first engagement portion being selectively engageable with one of the second engagement portion and the third engagement portion.

18. The edible dog chew toy recited in claim 6, wherein the first and third mass members each define generally semi-spherical configurations, at least one of the first and third mass members having a plurality of longitudinal grooves formed in an external surface thereof, and the other one of the first and third mass members having a plurality of quadrangular projections projecting from an external surface thereof.

* * * * *